(12) United States Patent
Ayachitula et al.

(10) Patent No.: US 7,231,396 B2
(45) Date of Patent: Jun. 12, 2007

(54) DATA ABSTRACTION LAYER FOR A DATABASE

(75) Inventors: Naga A. Ayachitula, Elmsford, NY (US); JoAnn Piersa Brereton, Hawthorne, NY (US); Adarsh Gupta, Potomac, MD (US); Michael Stephen Schwartz, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 10/626,273

(22) Filed: Jul. 24, 2003

(65) Prior Publication Data

US 2005/0021533 A1    Jan. 27, 2005

(51) Int. Cl.
*G06F 17/00* (2006.01)
*G06F 7/00* (2006.01)
(52) U.S. Cl. .......................... 707/101; 707/102; 707/3
(58) Field of Classification Search ............ 707/1–200
See application file for complete search history.

(56) References Cited

U.S. PATENT DOCUMENTS

| | | | |
|---|---|---|---|
| 5,394,546 A | | 2/1995 | Hanatsuka ................ 707/4 |
| 5,696,961 A | | 12/1997 | Briscoe et al. ............. 707/1 |
| 5,710,915 A | * | 1/1998 | McElhiney .................. 707/3 |
| 5,717,925 A | * | 2/1998 | Harper et al. ............ 707/102 |
| 5,761,493 A | | 6/1998 | Blakeley et al. ........... 707/4 |
| 5,920,870 A | | 7/1999 | Briscoe et al. ......... 707/104.1 |
| 6,014,677 A | * | 1/2000 | Hayashi et al. ........ 707/104.1 |
| 6,041,325 A | * | 3/2000 | Shah et al. ................ 707/10 |
| 6,073,138 A | | 6/2000 | de l'Etraz et al. ..... 707/104.1 |
| 6,317,737 B1 | * | 11/2001 | Gorelik et al. ............. 707/3 |
| 6,324,541 B1 | | 11/2001 | de l'Etraz et al. ..... 707/104.1 |
| 6,611,838 B1 | * | 8/2003 | Ignat et al. ............. 707/101 |
| 6,629,091 B1 | * | 9/2003 | Miura et al. ............... 707/2 |
| 6,643,652 B2 | * | 11/2003 | Helgeson et al. .......... 707/10 |
| 6,782,383 B2 | * | 8/2004 | Subramaniam et al. ...... 707/3 |
| 6,934,696 B1 | * | 8/2005 | Williams et al. ........... 706/47 |
| 2002/0103780 A1 | | 8/2002 | Bird et al. ................. 707/1 |
| 2002/0174196 A1 | * | 11/2002 | Donohoe et al. .......... 709/219 |
| 2002/0194263 A1 | | 12/2002 | Murren et al. ............ 709/203 |
| 2004/0117397 A1 | * | 6/2004 | Rappold, III ............ 707/102 |
| 2004/0139070 A1 | * | 7/2004 | Dysart et al. .............. 707/3 |
| 2004/0199495 A1 | * | 10/2004 | Colbath et al. ............. 707/3 |

FOREIGN PATENT DOCUMENTS

WO    WO 99/64970    12/1999

* cited by examiner

*Primary Examiner*—Christian P. Chace
*Assistant Examiner*—Dennis Vautrot
(74) *Attorney, Agent, or Firm*—Fay Sharpe LLP

(57) ABSTRACT

An abstraction layer (50) is provided for facilitating accessing a database (10) containing database records each including a plurality of fields stored in one or more tables (12, 14). The abstraction layer (50) includes a control table (52) containing control records corresponding to database fields. Each control record contains metadata associated with the corresponding database field. The abstraction layer (50) also includes at least one additional table (54, 56, 58, 60, 62, 64, 66, 70, 72, 74, 80) containing additional metadata. Each database field is selectively associated with one or more selected portions of the additional metadata through metadata contained in the control record corresponding to the database field. A user database application (30) accesses the database (10) using metadata obtained from the abstraction layer (50).

34 Claims, 3 Drawing Sheets

DATA ABSTRACTION LAYER FOR A DATABASE

BACKGROUND OF THE INVENTION

1. Field of the Invention

The present invention relates to the art of information processing. It finds particular application in key-based database systems such as relational databases, network databases, hierarchical databases, and the like, and will be described with particular reference thereto. However, the present invention is useful in many other types of key-based digital data storage and digital data processing systems.

2. Description of Related Art

Databases are commonly employed for storing large quantities of similar or dissimilar data on digital systems. These databases typically follow a particular data model defined by database-specific features such as the selection of tables and table fields containing fields of the database, the data types of the various database fields, and so forth. In a key-based database system, one or more key columns are included in each table to associate the fields of a given database record across tables and table columns.

In addition to the data model, the database system architecture defines other operational characteristics of the database. For example, the database system typically will incorporate or be compatible with certain data operators that are available for combining, comparing, sorting, retrieving, or otherwise manipulating the various columns of data. Relational databases and some other databases are commonly configured to be manipulated using structured query language (SQL) queries.

Still further, the stored data itself further defines operational characteristics of the database. For example, text-based data is stored in a selected language, such as English, French, or so forth. Numeric quantities may be stored in particular units, such as monetary U.S. dollars or European euros. Time values may be specific to a particular time zone.

The effect of these various factors is to constrain a user or database application programmer to interact with the database using a rigid and inflexible format. Input data or queries are configured or structured in the language used for the textual data of the database, and receive search results or other database output in that language. If the database is in French, for example, then a user who inputs data in English or constructs queries in English will generally cause or receive adverse results. Similarly, database searching is limited to the available data operators, SQL commands, or other available search tools, and search parameters must be inputted in the language used for text entries of the database. Still further, the user dialog box displays field names and other descriptive text in the database language, making it difficult or impossible for a user unfamiliar with that language to successfully interact with the database.

An application programmer who wants to add additional functionality to the database has to write extensive code to implement the additional functionality. Moreover, this extensive code must be incorporated into each database application that accesses the additional functionality. In a typical commercial setting, the database system is provided by a first software vendor, the database is constructed in-house, and various database application programs are optionally provided by third party vendors. Each vendor develops separate and distinct programming code for extending functionality of the database in different ways, which introduces difficulties in cross-vendor software compatibility and forces the database user to deal with various different user interfaces. Moreover, there may be substantial difficulty in adapting a given commercial application program to the existing data model defined by the tables and their structure.

This situation has substantial disadvantages. Users are restricted to employing the language and vocabulary of the database and database system in inputting, searching, or otherwise manipulating the database. Data typing of user input is limited, which may allow the user to input uninterpretable data into the database. Similarly, inappropriate data typing in search construction can result in faulty search results such as missed database records due to mismatches between the constructed search pattern and the format of data stored in the database. For example, a search that does not account for leading white space may miss textual data that includes one or more leading spaces.

The present invention contemplates an improved method and apparatus which overcomes these limitations and others.

SUMMARY OF THE INVENTION

In accordance with one aspect of the invention, an abstraction layer is disclosed for a database containing database records each including a plurality of fields stored in one or more tables, the fields being associated with the record by a key disposed in at least one key column of each of the one or more tables. The abstraction layer includes a key column identifier that identifies the at least one key column, and one or more metadata tables containing metadata relating to the database. The one or more metadata tables include at least a controls table containing control records corresponding to fields of the database. The control record for each field includes at least a control key associating the control record with the field and at least one metadatum corresponding to the field.

In accordance with another aspect of the invention, a method is provided for accessing a database containing database records each including a plurality of fields stored in one or more tables. A database access command is formulated using metadata related to the database contained in an abstraction layer. The metadata for each database field is accessible using an abstraction layer control record associated with the database field. The formulated database access command is executed to access the database.

In accordance with yet another aspect of the invention, an article of manufacture is disclosed, comprising one or more program storage media readable by a computer and embodying at least an abstraction layer for facilitating accessing a database containing database records each including a plurality of fields stored in one or more tables. The abstraction layer includes a control table containing control records corresponding to database fields. Each control record contains metadata associated with the corresponding database field. The abstraction layer also includes at least one additional table containing additional metadata. Each database field is selectively associated with one or more selected portions of the additional metadata through metadata contained in the control record corresponding to the database field.

Numerous advantages and benefits of the invention will become apparent to those of ordinary skill in the art upon reading and understanding this specification.

BRIEF DESCRIPTION OF THE DRAWINGS

The invention may take form in various components and arrangements of components, and in various process opera

DETAILED DESCRIPTION OF THE PREFERRED EMBODIMENTS

Figure 1:
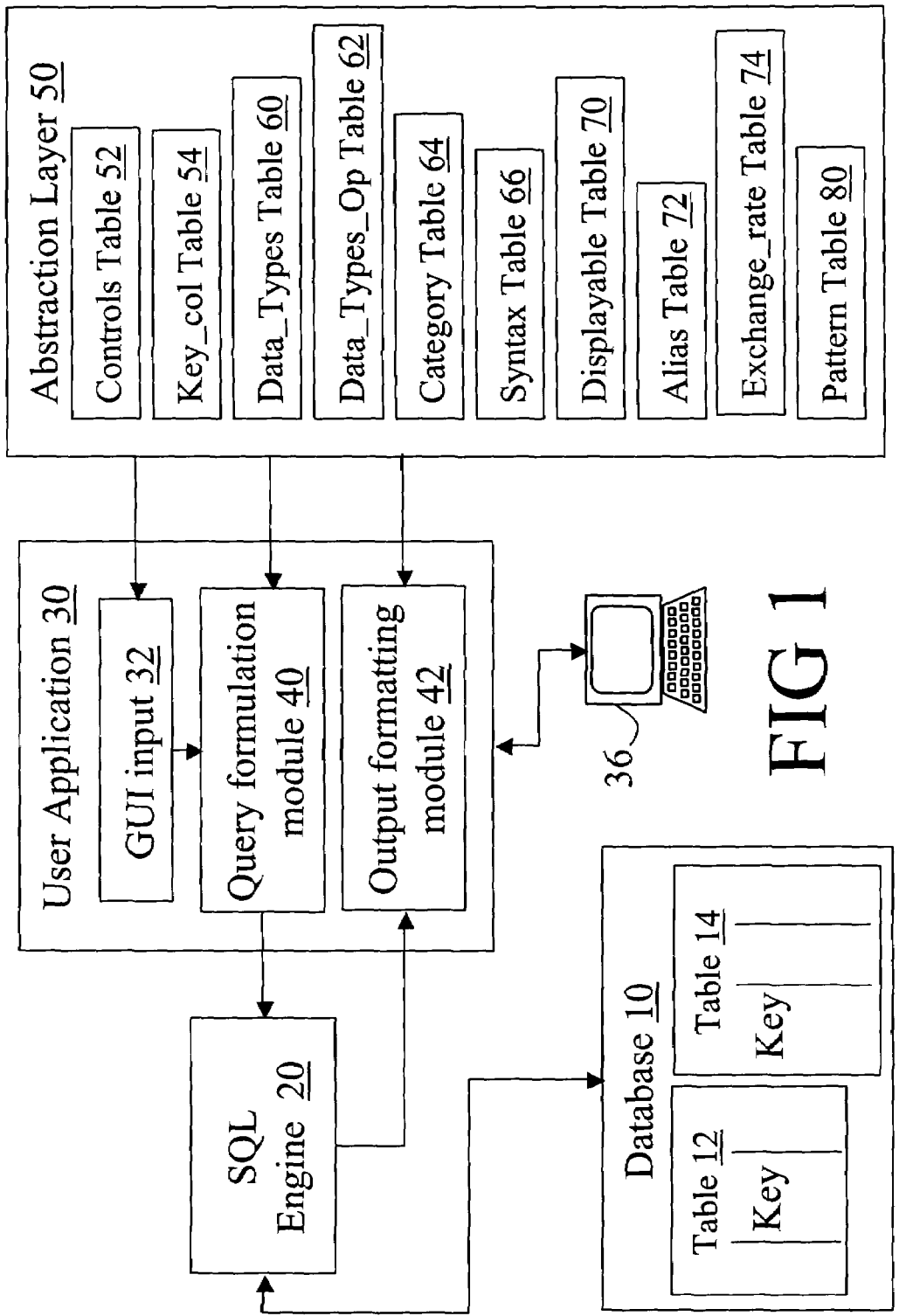
- FIG. 1 shows a block diagram of a database application system including a user application that interacts with a database through an abstraction layer.

With reference to FIG. 1, a key-based database 10 includes data stored in columns or fields of one or more tables 12, 14. Each record of the database is made up of typically several fields, which may be distributed among columns of the one or more tables 12, 14. To associate fields of each database record together, each table 12, 14 includes a key field or key column (denoted "Key" in FIG. 1). The database record has a unique key value which is stored in the key field of each table row containing one or more of the database fields. Some tables may have a key value entered more than once as they are multi-valued tables.

In exemplary FIG. 1, the database 10 is a relational database that is accessed using structured query language (SQL) queries processed by an SQL engine 20. The database can, however, be other than a relational database. For example, the database can be a network database, a hierarchical database, or other type of key based database, and can be accessed by an interface other than by the SQL engine 20.

A user database application 30 provides an end-user with access to the database 10 to perform selected operations, such as data input, searches, data sorting, report preparation, construction of summary charts for forecasting, or the like. The application 30 includes a graphical user interface (GUI) input module 32 that provides a GUI dialog window displayed on a computer 36. Instead of the computer 36, other suitable interfacing devices can be employed such as a personal data assistant (PDAs), a cellular telephone, a tablet pc, or the like. The user inputs selected information through the GUI dialog window generated and maintained by the GUI input module 32 to construct a search query, to define a search pattern, to provide input data to be added to the database 10, or to perform another database-related task.

An SQL query formulation module 40 receives the user input supplied through the GUI input module 32, and constructs an SQL query based thereon that is communicated to the SQL engine 20. The SQL query is applied by the SQL engine 20 to the database 10 to generate query results that are communicated back to the user application 30. An output formatting module 42 of the application 30 suitably formats the query results into a displayable list, a spreadsheet, a displayable summary table, an audio response, or other human-receivable output that is presented to the user through the computer 36.

In addition to the illustrated GUI input module 32, query formulation module 40, and output formatting module 42, it is to be understood that the user database application 30 can include other components such as a spreadsheet program, numerical processing modules for performing functions such as statistical processing, and so forth. The user application 30 can reside on the computer 36, on a network (not shown), or elsewhere.

To provide the application 30 with extended functionality, an abstraction layer 50 associated with the database 10 is referenced by the application 30 during generation of the GUI dialog window, formulation of the SQL query, and formatting the returned query results. The provided extended functionality can include but is not limited to: multilingual user interfacing; increased flexibility in search patterning; enhanced user input data typing; conversion of monetary units or other unit conversions; and the like. Moreover, the abstraction layer can provide a uniform database interface that is substantially independent of the specific characteristics of the underlying model of the database 10, and that uses a common user input configuration. This facilitates conformation of third-party vendor products to a common user interface standard.

The abstraction layer 50 is built around a controls table 52 that contains control records corresponding to fields of the database 10. The control record corresponding to a given database field contains metadata associated with that database field, and also contains a control key, which is preferably a large integer, that provides a unique key for the controls table 52. The metadata is selected to provide the selected enhanced database interfacing functionality. One exemplary set of fields for the controls table 52 is given in Table I.

TABLE I

| Controls table fields |
| --- |
| Control_key |
| Field_name_internal |
| Field_type |
| Field_size |
| Field_scale |
| Field_display_size |
| Field_table_name |
| search_flag |
| sort_flag |
| display_flag |
| case_type |
| Controlled_vocabulary |
| picklist_flag |
| Text_index |
| Text_subsection |
| Subselect_name |
| Subselect_value |
| Subselect_value_type |
| Subselect_attrname |
| Subselect_attrvalue |
| Subselect_attrvalue_type |
| Subselect_table_name |

The controls table 52 is preferably embodied as a table having rows corresponding to control records and columns corresponding to fields of the controls table 52. In this preferred table embodiment, Table I identifies the columns of the controls table 52.

As noted previously, to associate the various rows or records of the tables 12, 14 with corresponding database records, a key column or field is provided in the tables 12, 14. The unique key column or field which contains the unique key for bringing data fields comprising a database record together is identified by a key-col table 54. An exemplary key-col table 54 is shown as Table II.

TABLE II

Key table

Key_column_name
Key

In Table II, "Key_column_name" is a column or field header, and "Key" contains the name of the key column. The key column is a part of each table 12, 14. Some tables may have a key value entered more than once as they are multi-valued tables.

The controls table 52 and the key-col table 54 provide a suitable framework for the abstraction layer 50. The abstraction layer 50 optionally contains additional tables containing other metadata. The additional metadata can be incorporated into a control record by an index value metadatum stored in a field of the control table 52. Alternatively, the metadata can be incorporated as a searchable table that contains suitable substitute words or phrases for multilingual applications, aliasing, or the like. Still further, the metadata can provide constraints on particular tables or table columns of the tables 12, 14 that form the underlying database model of the database 10. Still yet further, the metadata of an additional table can be linked with specific database fields through the control key of the controls table 52. With reference to exemplary controls table 52 whose control record fields are identified in Table I and with further reference to FIG. 1, exemplary metadata that are suitably stored in the controls table or in additional tables of the abstraction layer 50 are described.

A "Control_key" field identified in Table I contains the control key of the control record, and provides a unique key to the control record. Two other fields "Field_name_internal" and "Field_table_name" identify the table 12, 14 and column or field thereof containing the database field associated with the control record. These fields of the controls table 52 define an alternative unique key for the controls table 52. This alternative unique key advantageously provides sufficient information for accessing the database fields of the underlying database 10.

A field "Field_type" of the exemplary controls table 52 identifies a data type of the database field corresponding to the control record. In one embodiment, the "Field_type" field directly contains the data type (for example, "CHAR", "NUMBER", "TEXT", "DATE", "TIME", "TIMESTAMP"). In another embodiment, the "Field_type" field contains a datatype index value which references a data types table 60. A suitable data types table 60 is shown as Table III.

TABLE III

Data types table

| Datatype_id | datatype |
| --- | --- |
| 1 | CHAR |
| 2 | NUMBER |
| 3 | TEXT |
| 4 | DATE |
| 5 | TIME |
| 6 | TIMESTAMP |

In the data types table 60 shown in Table III, the column with heading "Datatype_id" stores data type index values, while the column with heading "datatype" identifies the datatype corresponding to the data type index value. Using the data types table 60 advantageously makes the definition of data types open ended, as data types can be added, removed, or modified by modifying the data types table 60. By accessing the "Field_type" control record field, the user application 30 can determine the data type of the field, which enables stronger type checking by the GUI input module 32.

To enable the GUI input module 32 to formulate queries using operator selections in the user's native language, a data types operators table 62 is optionally provided which includes suitable names for data operators in two or more languages. This, in turn, enables the GUI input module 32 to operate as a multilingual user interface. A portion of a suitable data types operators table 62 is shown as Table IV.

TABLE IV

Data types operators table

| datatype_id | operator | Display_operator | language |
| --- | --- | --- | --- |
| 1 | > | is greater than | en_US |
| 1 | < | is less than | en_US |
| 1 | <> | is not equal to | en_US |
| 1 | >= | is greater than or equal to | en_US |
| 1 | <= | is less than or equal to | en_US |
| 1 | = | is equal to | en_US |
| 1 | LIKE | Like | en_US |
| 1 | NOT LIKE | not like | en_US |
| 2 | > | is greater than | en_US |
| 2 | < | is less than | en_US |
| 2 | <> | is not equal to | en_US |
| 2 | >= | is greater than or equal to | en_US |
| 2 | <= | is less than or equal to | en_US |
| 2 | = | is equal to | en_US |
| 3 | CONTAINS | contains | en_US |
| 3 | NOT CONTAINS | not contains | en_US |
| 4 | > | is greater than | en_US |
| 4 | < | is less than | en_US |
| 4 | <> | is not equal to | en_US |
| 4 | >= | is greater than or equal to | en_US |
| 4 | <= | is less than or equal to | en_US |
| 4 | = | is equal to | en_US |
| 4 | BEFORE | before | en_US |
| 4 | AFTER | after | en_US |
| 4 | RANGE | range | en_US |
| 5 | > | is greater than | en_US |
| 5 | < | is less than | en_US |
| 5 | <> | is not equal to | en_US |
| 5 | >= | is greater than or equal to | en_US |
| 5 | <= | is less than or equal to | en_US |
| 5 | = | is equal to | en_US |
| 5 | BEFORE | before | en_US |
| 5 | AFTER | after | en_US |
| 5 | RANGE | range | en_US |
| 6 | > | is greater than | en_US |
| 6 | < | is less than | en_US |
| 6 | <> | is not equal to | en_US |
| 6 | >= | is greater than or equal to | en_US |
| 6 | <= | is less than or equal to | en_US |
| 6 | = | is equal to | en_US |
| 6 | BEFORE | before | en_US |
| 6 | AFTER | after | en_US |
| 6 | RANGE | range | en_US |

The column with heading "language" of the data types operators table 62 identifies the language. In the portion of the data types operators table 62 displayed as Table IV, all shown entries correspond to U.S. English (indicated as "en_US"). However, the data types operator table 62 preferably also includes entries in French, German, or other languages to provide for display of operators in a selected language on a GUI dialog window, a printed report, or elsewhere. The "datatype_id" column of the data types operators table 62 identifies the data type the operator is applicable to using the data type indices specified in the data types table 60 shown in Table III. Note that some operators, such as the "is greater than" operator, have multiple entries in Table IV because such operators are applicable to more than one data type.

The various tables 12, 14 of the database 10 can be different. For example, they can have different numbers of rows and columns, and can contain different types of data. Some of the tables 12, 14 may be searchable, while others may merely catalog information in a format that is not amenable to searching. Thus, different tables may have different entry points. Optionally, a category table 64 identifies entry points for each table. By referencing the "Field_table_name" control record field to identify which table 12, 14 contains a database field of interest and then referencing the category table 64, a suitable entry point for manipulating the database field of interest is identified. A portion of a suitable category table 64 is shown as Table V.

TABLE V

Categories table

| Table_name | Category |
|---|---|
| Catalog_Record | Search |
| Catalog_Record | Catalog |
| Video_Record | Search |

The category table 64 shown as Table V has a unique index consisting of "Table_name" and "Category".

In addition to the data typing information contained in the control record field "Field_type" of the controls table 52 which references the data types table 60, each control record optionally contains further information about characteristics of the field. The exemplary controls table 52 whose control record fields are identified in Table I includes a "Field_display_size" control record field that identifies the size of the field for display purposes. For example, a numeric field with "Field_size"=10 would have a maximum of ten displayable digits.

"Field_size" and "Field_scale" control record fields characterize internal characteristics of the corresponding database field. For a numeric database field whose corresponding "Field_size"=10 and whose corresponding "Field_scale"=2, the field contents have a maximum of ten digits with two digits being right of the decimal point, that is, with two digits being fractional places. For fields of certain data types, such as the DATE, TIME, and TIMESTAMP data types, one or both of the corresponding control record fields "Field_size", and "Field_scale" may be null.

A "search_flag" control record field identifies the type of searching that can be performed on the corresponding database field. In one suitable arrangement: "search_flag"=0 indicates that the database field is not searchable; "search_flag"=1 indicates that the database field is searchable via an SQL query; "search_flag"=2 indicates that the database field is searchable via a text search using the "Text_index" and "Text_subsection" fields of the control record; and "search_flag"=3 indicates that the database field is searchable via a text search using the subselect fields indicated in the exemplary controls table 52 whose control record fields are identified in Table I. The "Subselect_value_type" and "Subselect_attrvalue_type" fields are set to data types as defined in the data types table 60 shown in Table III. The "case_type" control record field indicates whether text searches are case-sensitive: for example, "case_type"=1 selects case-sensitive searching while "case_type"=0 selects case-insensitive searching.

A "sort_flag" control record field identifies whether sorting can be performed on the corresponding field. For example, "sort_flag"=1 indicates that sorting can be done on the corresponding database field if it is part of the tables involved in the query. On the other hand, "sort_flag=0" indicates that the corresponding database field is not sortable. Similarly, the "display_flag" control record field indicates whether the corresponding database field is displayable.

A "controlled_vocabulary" field is optionally provided in the control record to limit an input vocabulary or to enable other syntax checking of user inputs to the corresponding database field. In one suitable approach, a null value of the "controlled_vocabulary" field indicates no syntax checking, while to enable syntax checking the "controlled_vocabulary" field points to a syntax table 66 that contains allowed words or syntactical formats for inputs to the corresponding database field. Optionally, the syntax table 66 is a multilingual table including a "Language" field to support multilingual operation with an appropriate vocabulary for each selectable language. Instead of the syntax table 66, the "controlled_vocabulary" field optionally can link to a more complex controlled vocabulary software module or system to provide more elaborate syntax control.

Similarly, a "picklist_flag" can be set to indicate to the GUI input module 32 that it should provide the user with a drop-down box or other limited-input dialog box listing the allowable inputs contained in the syntax table 66. The user can then select the desired input from the list of allowable inputs using a mouse or other pointing device. This approach advantageously ensures syntactically correct input and is convenient for the user. By including the "picklist_flag" in the controls table 52, the preferred user interface is enforced across applications. This advantageously encourages uniformity of the user interface across database applications and across database application vendors.

A displayable table 70 is optionally provided to enable multilingual identification of the names of the database fields. A portion of an exemplary displayable table 70 is shown as Table VI.

TABLE VI

Displayable table

| Control_key | Display_name | Language |
|---|---|---|
| 1 | Catalog | en_US |
| 1 | catalogue | fr_FR |
| 2 | abstract | en_US |
| 2 | resume | fr_FR |

The "control_key" field of the displayable table 70 correlates with the "Control_key" field of the controls table 52 as identified in Table I, and thus identifies the database field whose name is given in the "Display_name" field of the displayable table 70. The "Language" field of the displayable table 70 indicates the language; for example, "en_US" indicates U.S. English, while "fr_FR" indicates French. Optionally, German can be supported using suitable German display names indicated by "de_DE" indicating the German language. Of course, other languages can similarly be supported. The displayable table 70 has a unique index consisting of the "Display_name" and "Language" fields.

An aliases table 72 optionally provides aliases, which may be multilingual, for field names. A portion of an exemplary aliases table 72 is shown as Table VII.

TABLE VII aliases table

| Control_key | Alias | Language |
|---|---|---|
| 1 | catalog | en_US |
| 1 | record_id | en_US |
| 2 | abstract | en_US |
| 2 | abs | en_US |

The aliases table 72 acts as an external symbolic dictionary for a parser. It is connected to the controls table 52 through the "Control_key" field. An advantage of using the aliases table 72 is that the parser is able to dynamically adjust as the aliases are changed. For example, using the aliases table 72 as shown in Table VII, a user can input either "abs" or "abstract" to refer to the database field designated by control key value=2. The "Language" field of the aliases table 72 enables multilingual aliasing and supports translation of field names across languages. In addition to the illustrated U.S. English ("en_US") entries, the aliases table 72 preferably also contains entries that support French, German, or other languages. and The aliases table 72 has a unique index consisting of the "Alias" and "Language" fields.

For database applications which employ monetary units, multilingual operation preferably extends to monetary quantities. An exchange_rate table 74 provides for conversion of monetary units for multilingual users. A portion of a suitable exchange_rate table 74 is shown in Table VIII.

TABLE VIII

Exchange rate table

| Control_key | Exchange_rate | Text | Symbol | Position | Language |
|---|---|---|---|---|---|
| 3 | 1.00 | dollar | $ | 0 | en_US |
| 3 | 0.86 | euro | € | 0 | fr_FR |
| 3 | 0.86 | euro | € | 0 | de_DE |

In the exchange_rate table 74 shown in Table VII, the "exchange_rate" field stores the exchange rate normalized to U.S. dollars. The "Text" field stores a textual name for the monetary unit, while the "Symbol" field stores the monetary unit symbol. The "Position" field indicates whether the symbol goes before or after the monetary value. For example, "Position"=0 indicates that the dollar sign ($) precedes the monetary value. The "Language" field identifies the language of the country that employs the corresponding monetary unit.

In the case of text searching, problems can arise due to limited capability of a search pattern which may not match with certain database records that should be identified and returned. For example, a search pattern "screw" on a selected search field may miss "set screw" or "machine screw" because of the leading "set" or "machine" text.

Optionally, a pattern table 80 is provided which contains search patterns that solve commonly encountered search problems for a text search on a given database field. An SQL search is preferably done on such a database field using the search patterns given in the pattern table 80. A suitable pattern table 80 is shown as Table IX.

TABLE IX patterns table

| Control_key | Pattern |
|---|---|
| 2 | %xyz% |

The exemplary patterns table 80 of Table IX uses the "%xyz%" search pattern for the database field designated by "Control key"=2, where the pattern table field "Control key" connects with the "Control key" field of the controls table 52. The search pattern "%xyz%" is standard for SQL query searching of a relational database: the leading and trailing "%" symbols indicate that the text "xyz" may be anywhere within the text field. That is, "%xyz%" will capture, for example, "abcxyz123" or "set xyz". Of course, other search patterns can be supplied in the patterns table 80, and such supplied patterns are not limited to SQL query search patterns. The patterns table 80 advantageously facilitates pattern recognition and switching to a different search based upon the pattern.

It is to be understood that the specific structure and metadata of the abstraction layer 50 described herein is exemplary only. Those skilled in the art can readily modify the controls table 52 of the abstraction layer 50 to provide additional or different metadata for selectively extending functionality of the database interface. The described abstraction layer 50 is readily implemented in relational, network, hierarchical, or other types of database systems by constructing a suitable controls table, key_col table, and other selected metadata tables using the available database system. Typically, the abstraction layer 50 is constructed using the same database system that was used to construct the subject database 10; however, it is also contemplated to construct the abstraction layer 50 in a different database system. For example, the database 10 can be constructed in a hierarchical database system, while the abstraction layer 50 can be constructed in a network database system.

Moreover, it is to be appreciated that FIG. 1 shows an overall system that employs the abstraction layer 50, the system also including the database 10, the SQL query engine 20, and the user application 30. The abstraction layer 50 can, however, be embodied in various ways. For example, the abstraction layer 50 can be embodied as an article of manufacture comprising one or more storage media readable by a computer and embodying the abstraction layer 50 as data stored on the one or more storage media. Such an embodiment corresponds, for example, to a programmer development package that a software developer uses to develop the user application 30.

In another embodiment, the above-described one or more storage media additionally include the user database application 30 as a bundled package. Such an embodiment corresponds, for example, to a user application program suitable for marketing to an end-user. Still further, the abstraction layer 50 can be provided as a component of an overall database system package provided to the end-user. Those skilled in the art can construct other embodiments employing the abstraction layer 50 in ways that are suitable for specific situations.

Figure 2:
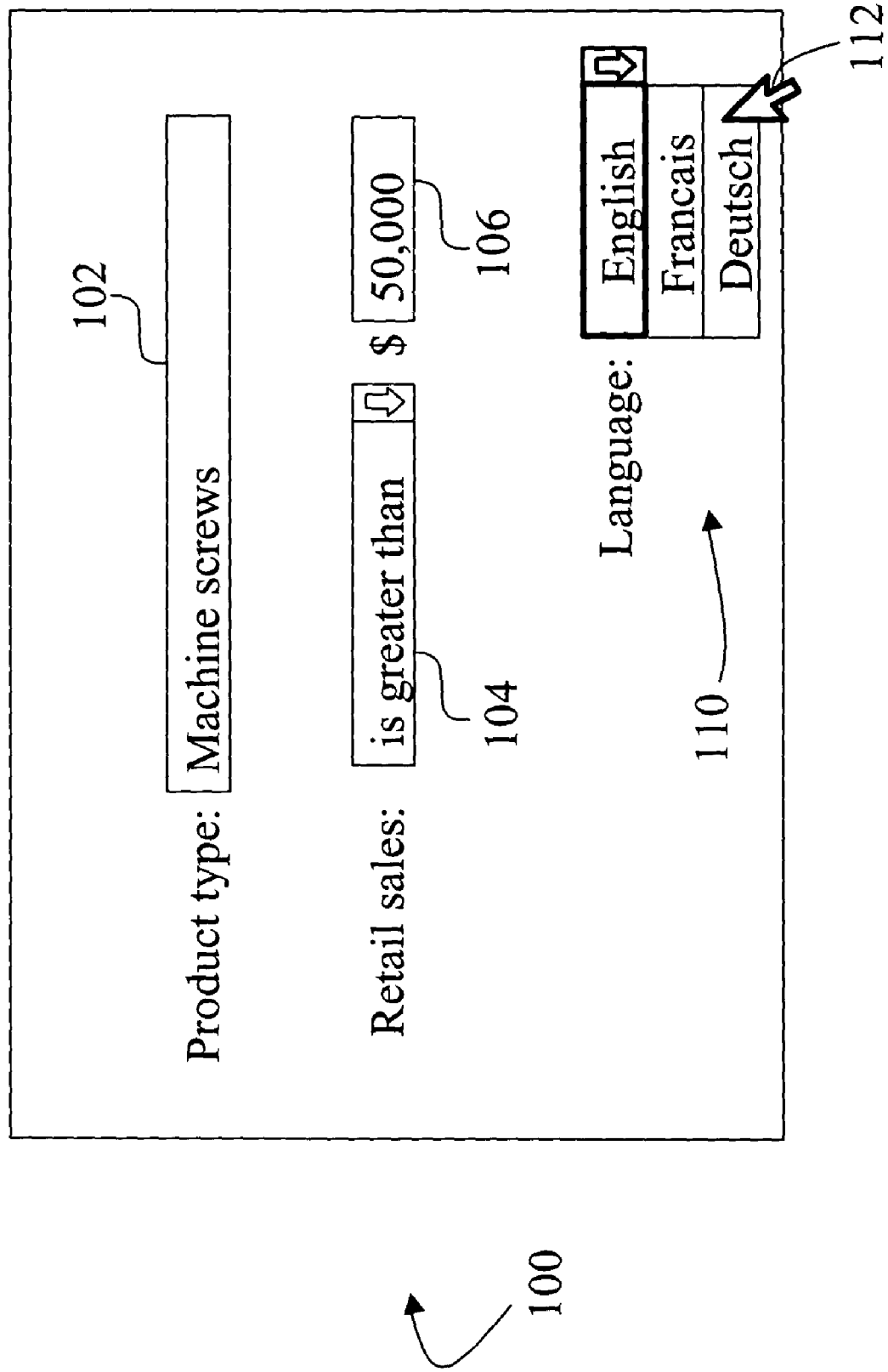
FIG. 2 shows an exemplary graphical user dialog window in English, with the user in the process of selecting switching to a Deutsch (German) dialog window.
Figure 3:
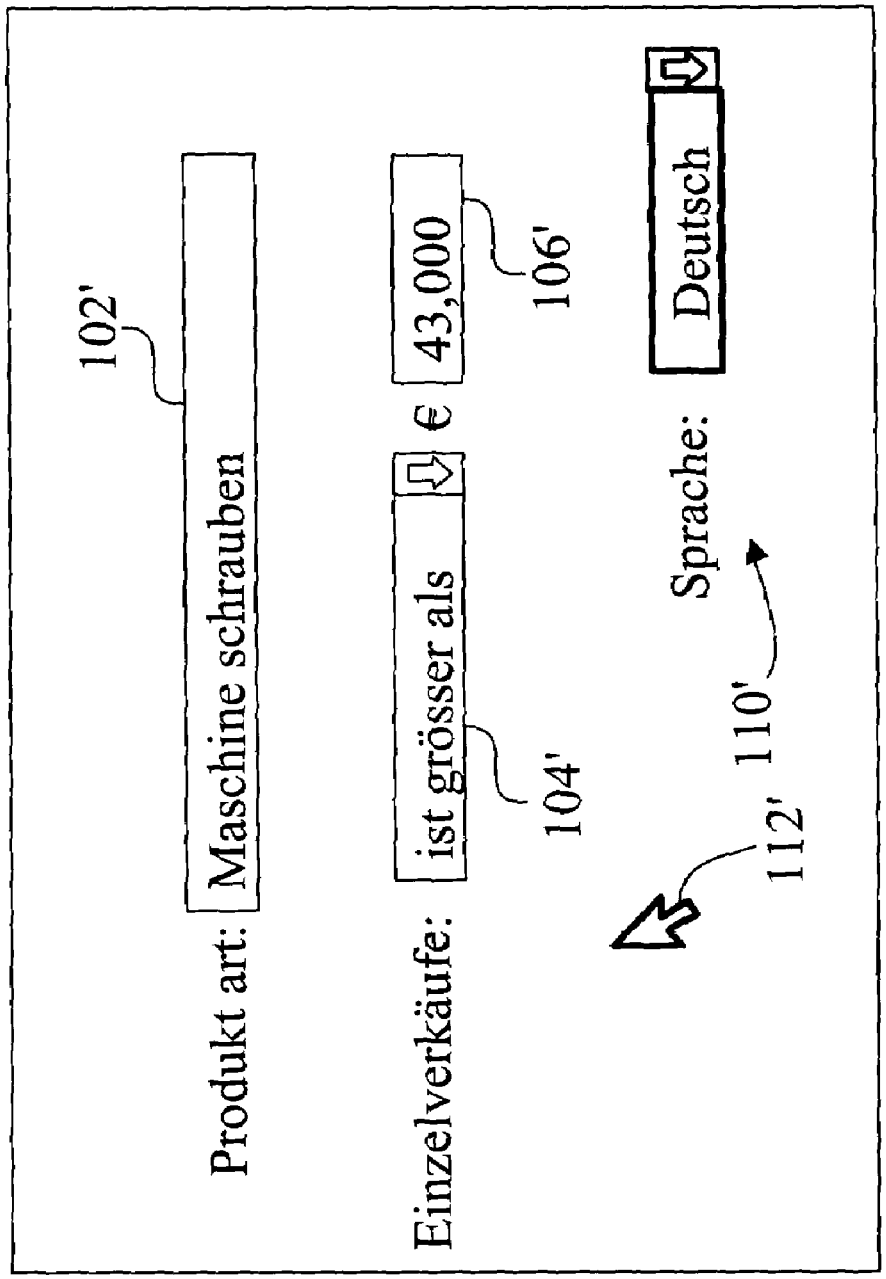
FIG. 3 shows an updated graphical user dialog window after switching to Deutsch (German) by referencing metadata stored in the abstraction layer.

With continuing reference to FIG. 1 and with further reference to FIGS. 2 and 3, an exemplary application of the abstraction layer 50 is described. FIG. 2 shows a snapshot of a GUI dialog window 100 generated and operated by the GUI input module 32 of the user application 30. At the time of the snapshot, the dialog window 100 includes a text input 102 containing the text "Machine screws", an operator input 104, and a numeric input 106, The GUI dialog window 100 further includes text labels "Product type" and "Retail sales" that correspond to database field names, and a monetary unit "$" corresponding to the numeric input 106.

It will be recognized that the GUI dialog window 100 is in English, as selected by a drop-down language selector 110. The text labels corresponding to the database field names are suitably extracted from the displayable table 70 using a unique index including the database field name and the English language selection. The operator input 104 is presently selected from a drop-down list as the English phrase "is greater than" which is contained in the data types operators table 62. The U.S. monetary unit symbol "$" is selected from the exchange rate table 74.

At the time of the snapshot shown in FIG. 2, the user (who is presumably a German speaker), is in the process of switching the dialog window over to a German-text window. The user is selecting the German language (that is, "Deutsch" which is the German word referencing the German language) using a mouse pointer 112 operating on the drop-down language selector 110, as shown in FIG. 2. Once complete, this language selection operation causes the GUI input module 32 to access the abstraction layer 50 using new unique keys that include a German language component.

With reference to FIG. 3, the result of the German language selection is the updated GUI dialog window 100' with the language selector 110' set to German (that is, "Deutsch"), in which the text input 102 has been updated to the text input 102' using the alias table 72 to convert the English-language "Machine screws" to German-language "Maschine schrauben". The corresponding database field name has been updated from the English-language "Product type" to the German language "Produkt art" using the displayable table 70 with a key having a German language component. Similarly, the English-language database field name "Retail sales" has been updated to corresponding the German language database field name "Einzelverkäufe" also using the displayable table 70 with the key having the German language component.

The operator input 104 displayed in English as "is greater than" has been updated to operator input 104' displayed in German as "ist grösser als" using the data types operators table 62 with a key including a German language component. The numeric input 106 has been updated to numeric input 106' by converting the $50,000 monetary value suitable for an English speaker to a euros-based monetary value suitable for a German speaker of €43,000, where the amount has been reduced by the correction factor of 0.86 suitable for euros. This conversion is performed by accessing the exchange rate table 74 using a new key which includes the German language component "de_DE". During this conversion, the dollar monetary unit symbol "$" shown in FIG. 2 and appropriate for an English speaker is replaced by the euro monetary unit "€" suitable for a German speaker, again by accessing the exchange rate table 74 with the key that includes the German language component "de_DE".

The multilingual GUI dialog window application described with reference to FIGS. 2 and 3 is exemplary only. In a similar manner, the results of search queries can be converted to a selected user language by the output formatting module 42 by accessing multilingual tables of the abstraction layer 50, such as the data types operators table 62, the syntax table 66, the displayable table 70, the alias table 72, and the exchange rate table 74, using unique keys formulated with a suitable language-identifying key component. The abstraction layer 50 can also be used to facilitate pattern recognition through the pattern table 80. The abstraction layer 50 is readily configured to support substantially any field name alias in substantially any language through suitable entries in the alias table 72. In searching and sorting operations, various control record fields of the controls table 52 can be used to limit searches and sorts based on choice of database field, data type, and other constraints.

The abstraction layer 50 advantageously supports flexibility in the extension of accessibility of the database 10. For example, the multilingual tables of the abstraction layer 50 can support only selected languages, or only a single language, depending upon the specific application. The pattern table 80 can incorporate selected search patterns that solve search problems for a specific database implementation. Additional or modified data types, operators, database fields, and the like are also readily supported by modifications to corresponding metadata tables of the abstraction layer 50.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. An abstraction layer embodied on a computer-readable storage media for a database containing database records each including a plurality of fields stored in one or more tables, the fields being associated with each associated record by a key disposed in at least one key column of each of the one or more tables, the abstraction layer comprising:
   a key column identifier table that identifies the at least one key column; and
   one or more metadata tables containing metadata relating to the database, the one or more metadata tables including at least:
   a controls table containing control records corresponding to fields of the database, the control record for each field including at least a control key associating the control record with the field and at least one metadatum corresponding to the field, wherein functionality of the database can be selectively extended by modification of the controls table;
   wherein the abstraction layer is separate from the database, and the abstraction layer provides an interface to the database independent of an underlying model and functionality of the database thereby providing extensible functionality for the database separate from the underlying model and functionality of the database.

2. The abstraction layer as set forth in claim 1, wherein the at least one metadatum of at least one control record includes a datatype index value indicative of a datatype of the corresponding field, and the one or more metadata tables further include:
   a datatypes table associating a plurality of datatype indices with datatypes.

3. The abstraction layer as set forth in claim 2, wherein the datatypes of the datatypes table are selected from a group including: a character datatype, a numeric datatype, a text data type, a date data type, a time datatype, and a timestamp datatype.

4. The abstraction layer as set forth in claim 2, wherein the one or more metadata tables further include:

an operators table associating a database operation with a database type index value and with a corresponding display operator.

5. The abstraction layer as set forth in claim 4, wherein the operators table further associates the database operation with a corresponding second display operator, and the operators table further includes:

a language field associating a different language with each of the corresponding display operator and the corresponding second display operator, whereby the database operation has associated therewith display operators in at least two different languages.

6. The abstraction layer as set forth in claim 2, wherein the datatype index value indicates that the corresponding field is numeric, and the at least one metadatum further includes:

a sub-datatype index value indicative of a type of numeric value of the corresponding field, the sub-datatype index value being selected from a group including at least integer and floating-point numeric value types.

7. The abstraction layer as set forth in claim 1, wherein the one or more tables includes at least two tables, and the control record for each field further includes a table name that in combination with the control key associates the control record with the field.

8. The abstraction layer as set forth in claim 7, wherein the one or more metadata tables further include:

a category table associating each of the at least two tables with one or more table characteristics.

9. The abstraction layer as set forth in claim 1, wherein the at least one metadatum of at least one control record includes a search flag indicative of a type of searching executable on the corresponding field.

10. The abstraction layer as set forth in claim 9, wherein the search flag has a value indicating that the corresponding field is searchable by a text search, and the at least one metadatum further includes:

a text search field region identifier indicating a portion of the corresponding field that is searchable by the text search.

11. The abstraction layer as set forth in claim 9, wherein the search flag has a value indicating that the corresponding field is searchable by an SQL query, and the at least one metadatum further includes:

at least one SQL query format indicator indicative of an allowable SQL query format.

12. The abstraction layer as set forth in claim 9, wherein the at least one metadatum further includes:

a case-sensitivity indicator that indicates whether searching on the corresponding field Is case-sensitive.

13. The abstraction layer as set forth in claim 1, wherein the at least one metadatum of at least one control record includes a sort flag identifying whether sorting can be done on the corresponding field.

14. The abstraction layer as set forth in claim 1, wherein the at least one metadatum of at least one control record includes a display flag identifying whether the corresponding field is displayable.

15. The abstraction layer as set forth in claim 1, wherein the one or more metadata tables further includes:

a displayable table associating a plurality of display names with a field of the database through the control key of the controls table, the plurality of display names each corresponding to a different language whereby the display name is multilingual.

16. The abstraction layer as set forth in claim 1, wherein the one or more metadata tables further includes:

a syntax table associating syntactically valid inputs with a field of the database through the control key of the control record corresponding to the field.

17. The abstraction layer as set forth in claim 16, wherein the at least one metadatum further includes:

a picklist flag indicating whether the entries of the syntax table are displayable as selections of an input of a GUI dialog box.

18. The abstraction layer as set forth in claim 1, wherein the one or more metadata tables further includes:

an aliases table associating alias names with fields of the database through the control key of the control record corresponding to the field.

19. The abstraction layer as set forth in claim 18, wherein the aliases table associates a plurality of alias names with at least one field of the database, each of the plurality of alias names having a language parameter associated therewith.

20. The abstraction layer as set forth in claim 1, wherein the one or more metadata tables further includes:

a patterns table associating one or more search patterns with a field of the database through the control key of the control record corresponding to the field.

21. A method for accessing a database embodied on a computer-readable storage media containing database records each including a plurality of fields stored in one or more tables, the fields being associated with each associated record by a key disposed in at least one key column of each of the one or more tables, the method comprising:

formulating a database access command using metadata related to the database contained in an abstraction layer, separate from the database, the abstraction layer including a key column identifier table that identifies the at least one key column, and the metadata for each database field being accessible using an abstraction layer control record associated with the database field; and executing the formulated database access command to access the database, the abstraction layer providing an interface to the database independent of an underlying model and functionality of the database; and providing extensible functionality for the database separate from the underlying model and functionality of the database, wherein the extended functionality can be effected by selective modification of the control record.

22. The method as set forth in claim 21, wherein the abstraction layer includes at least one translation table that includes equivalent text in a plurality of languages associated with at least one database field, the formulating of the database access command including:

accessing the abstraction layer using a key that includes at least a field identifier and a language selection to retrieve the equivalent text in the selected language.

23. The method as set forth in claim 22, wherein the key further includes:

a database access operator, the equivalent text being a displayable name for the database access operator.

24. The method as set forth in claim 21, wherein the abstraction layer includes:

a controls table containing the control records of the database fields, each control record including a field key; and at least one metadata table containing records corresponding to database fields and linked to the control record by the field key.

25. The method as set forth in claim 21, wherein the abstraction layer includes:
a controls table containing the control records of the database fields, each control record including at least one index metadatum; and
at least one additional metadata table containing indexed metadata associable with database fields by the at least one index metadatum of the control records.

26. The method as set forth in claim 21, further comprising:
executing a user application program, the formulating of a database access command being performed as an operation of the executing user application program.

27. An article of manufacture comprising one or more program storage media readable by a computer and embodying at least an abstraction layer for facilitating accessing a database containing database records each including a plurality of fields stored in one or more tables, the fields being associated with each associated record by a key disposed in at least one key column of each of the one or more tables, the abstraction layer including:
a key column identifier table that identifies the at least one key column;
a control table containing control records corresponding to database fields, each control record containing metadata associated with the corresponding database field, wherein functionality of the database can be selectively extended by modification of the control table, and
at least one additional table containing additional metadata, each database field being selectively associated with one or more selected portions of the additional metadata through metadata contained in the control record corresponding to the database field;
wherein the abstraction layer is separate from the database, and the abstraction layer provides an interface to the database independent of an underlying model and functionality of the database thereby providing extensible functionality for the database separate from the underlying model and functionality of the database.

28. The article of manufacture as set forth in claim 27, wherein the article of manufacture further embodies one or more instructions executable by the computer to perform a method for accessing the database, the method including:
formulating a database access command; and
during the formulating, accessing an abstraction layer to identify at least one constraint on the database access command.

29. The article of manufacture as set forth in claim 28, wherein the identified constraint on the database access command is selected from a group consisting of: a text string in a selected language that is incorporated into the database access command, a datatype constraint, a search pattern, a search constraint, a sorting constraint, and a display constraint.

30. The article of manufacture as set forth in claim 28, wherein the article of manufacture further embodies a user application program executable by the computer, the executing user application program being operatively linked with the method for accessing the database.

31. The abstraction layer as set forth in claim 1, wherein said extensible functionality for the database provided by the abstraction layer includes:
one or more modifiable metadata tables containing metadata relating to the database, the one or more modifiable metadata tables including at least:
a modifiable controls table containing control records corresponding to fields of the database, the control record for each field including at least a control key associating the control record with the field and at least one metadatum corresponding to the field, wherein the modifiable controls table can be modified to provide different or additional metadata for selectively extending the functionality of said database interface.

32. The abstraction layer as set forth in claim 31, wherein said one or more modifiable metadata tables includes at least one of:
a modifiable datatypes table associating a plurality of datatype indices with datatypes;
a modifiable operators table associating a database operation with a database type index value and with a corresponding display operator;
a modifiable displayable table associating a plurality of display names with a field of the database through the control key of the controls table, the plurality of display names each corresponding to a different language whereby the display name is multilingual; and
a modifiable exchange rate table providing for conversion of monetary units for multilingual users.

33. The method as set forth in claim 21, wherein said providing extensible functionality for the database provided by the abstraction layer includes:
providing one or more modifiable metadata tables containing metadata relating to the database, the one or more modifiable metadata tables including at least one of:
a modifiable controls table containing control records corresponding to fields of the database, the control record for each field including at least a control key associating the control record with the field and at least one metadatum corresponding to the field, wherein the modifiable controls table can be modified to provide different or additional metadata for selectively extending the functionality of said database interface;
a modifiable datatypes table associating a plurality of datatype indices with datatypes;
a modifiable operators table associating a database operation with a database type index value and with a corresponding display operator;
a modifiable displayable table associating a plurality of display names with a field of the database through the control key of the controls table, the plurality of display names each corresponding to a different language whereby the display name is multilingual; and
a modifiable exchange rate table providing for conversion of monetary units for multilingual users.

34. The article of manufacturing as set forth in claim 27, wherein said extensible functionality for the database provided by the abstraction layer includes:
one or more modifiable metadata tables containing metadata relating to the database, the one or more modifiable metadata tables including at least one of:
a modifiable controls table containing control records corresponding to fields of the database, the control record for each field including at least a control key associating the control record with the field and at least one metadatum corresponding to the field, wherein the modifiable controls table can be modified to provide different or additional metadata for selectively extending the functionality of said database interface;

a modifiable datatypes table associating a plurality of datatype indices with datatypes;

a modifiable operators table associating a database operation with a database type index value and with a corresponding display operator;

a modifiable displayable table associating a plurality of display names with a field of the database through the control key of the controls table, the plurality of display names each corresponding to a different language whereby the display name is multilingual; and a modifiable exchange rate table providing for conversion of monetary units for multilingual users.

* * * * *